United States Patent
Chen et al.

(10) Patent No.: US 10,146,083 B2
(45) Date of Patent: Dec. 4, 2018

(54) LIQUID CRYSTAL DISPLAY APPARATUS AND METHOD FOR FABRICATING THE SAME

(71) Applicants: Interface Optoelectronics (ShenZhen) Co., Ltd., Shenzhen (CN); General Interface Solution Limited, Miaoli County (TW)

(72) Inventors: Zheng-Xiao Chen, Guangdong (CN); Ching-Huang Lin, Guangdong (CN)

(73) Assignees: INTERFACE OPTOELECTRONICS (SHENZHEN) CO., LTD., Shenzhen (CN); GENERAL INTERFACE SOLUTION LIMITED, Miaoli County (TW)

( * ) Notice: Subject to any disclaimer, the term of this patent is extended or adjusted under 35 U.S.C. 154(b) by 43 days.

(21) Appl. No.: 14/751,109

(22) Filed: Jun. 25, 2015

(65) Prior Publication Data
US 2016/0274411 A1    Sep. 22, 2016

(30) Foreign Application Priority Data
Mar. 17, 2015 (CN) .......................... 2015 1 0117055

(51) Int. Cl.
*G02F 1/1335* (2006.01)
*G02F 1/1333* (2006.01)

(52) U.S. Cl.
CPC .. *G02F 1/133528* (2013.01); *G02F 1/133308* (2013.01); *G02F 1/133502* (2013.01); *G02F 2201/50* (2013.01); *G02F 2202/28* (2013.01)

(58) Field of Classification Search
CPC ......... G02F 1/133528; G02F 1/133308; G02F 1/133502
See application file for complete search history.

(56) References Cited

U.S. PATENT DOCUMENTS

| | | | | |
|---|---|---|---|---|
| 7,738,065 | B2* | 6/2010 | Shutou | G02B 5/3016 349/117 |
| 8,891,043 | B2* | 11/2014 | Kuwajima | G02F 1/1347 349/12 |
| 2012/0200812 | A1* | 8/2012 | Qi | B23K 26/38 349/106 |
| 2015/0036063 | A1* | 2/2015 | Chen | G02F 1/133502 349/12 |
| 2015/0070633 | A1* | 3/2015 | Miyazaki | G02F 1/133528 349/96 |
| 2016/0216542 | A1* | 7/2016 | Yoshida | G02F 1/133528 |

* cited by examiner

*Primary Examiner* — Dung Nguyen
(74) *Attorney, Agent, or Firm* — CKC & Partners Co., Ltd.

(57) ABSTRACT

A liquid crystal display apparatus includes a liquid crystal display module and a top polarizer. The liquid crystal display module has a display module upper surface. The top polarizer is disposed on the display module upper surface, and has a reinforced surface. The boundary of the top polarizer is extended from boundary of the display module upper surface. The top polarizer includes a main body and a reinforced film. The reinforced film is formed on the surface of the main body, which is disposed away from the liquid crystal display module, in which the reinforced surface is the surface of the reinforced film, which is disposed away from the liquid crystal display module.

18 Claims, 4 Drawing Sheets

LIQUID CRYSTAL DISPLAY APPARATUS AND METHOD FOR FABRICATING THE SAME

RELATED APPLICATIONS

This application claims priority to Chinese Application Serial Number 201510117055.5, filed Mar. 17, 2015, which is herein incorporated by reference.

BACKGROUND

Field of Invention

The present disclosure relates to a display apparatus. More particularly, the present disclosure relates to a liquid crystal display apparatus.

Description of Related Art

A conventional liquid crystal display apparatus usually includes three layers of stacks in the primary structure, such as a liquid crystal module, a light-emitting module, and a protection layer. A conventional liquid crystal display apparatus may further include other structures for advanced purposes. A liquid crystal module may include a top polarizer, a color filter, a thin film transistor, a liquid crystal layer, a bottom polarizer and so on, stacked together as a liquid crystal module. Yet, a conventional liquid crystal display apparatus usually adopts a cover lens or the like as a protection layer. There are two general structures for attaching a cover lens onto a liquid crystal display module to fabricate a liquid crystal display apparatus. Some may attach a cover lens onto upper fringe of a frame surrounding the liquid crystal display module by using an adhesion agent, such as a gasket, to cover the vulnerable liquid crystal display module surrounded by the frame. However, the aforesaid structure of a cover lens attaching onto a frame will create a gap between the cover lens and the liquid crystal display module, in which the gap may influence display performance. Similarly, in case the adhesion agent between the cover lens and upper fringe of the frame acts weakly, it would become easier for dust or foreign matter to access the visual area of the display apparatus, which would be difficult to remove and also influence display performance. Another way to fabricate a liquid crystal display apparatus may be to attach a cover lens onto an upper surface of a liquid crystal display module by proceeding full lamination with transparent OCA or hydrogel in between the liquid crystal display module and the cover lens. Owing to avoid generating bubbles or other problems in full lamination process, the liquid crystal display apparatus, fabricated by proceeding full lamination with transparent OCA or hydrogel, has a more complex fabricating process. Yet, in case the liquid crystal display module is broken, the repair process would also be more complex to raise the cost of repairing, which would also increase the cost of the liquid crystal display apparatus as materials used increase. Furthermore, thickness and weight of cover lens is an unsolved problem under the thinning tendency in product design.

Consequently, the available structure of a liquid crystal display apparatus, as described above, apparently exists inconvenience and defect, which needs further improvement. To deal with aforesaid problem, practitioners of ordinary skill in the art have striven to attain a solution, still lacks a suitable solution to be developed. Therefore, to deal with aforesaid problem effectively is an important subject of research and development, and also a desired improvement in the art.

SUMMARY

The present disclosure provides a liquid crystal display apparatus. The liquid crystal display apparatus includes a liquid crystal display module and a top polarizer. The liquid crystal display module has an upper surface of the liquid crystal display module. The top polarizer is disposed on the upper surface of the liquid crystal display module. The top polarizer has a reinforced surface located at a surface of the top polarizer away from the liquid crystal display module, in which a boundary of the top polarizer is extended from a boundary of the liquid crystal display module.

The present disclosure provides a method for fabricating a liquid crystal display apparatus. The method includes providing a liquid crystal display module, providing a top polarizer and attaching a pressure sensitive adhesive layer between the top polarizer and the liquid crystal display module. The top polarizer has a reinforced surface located away from the liquid crystal display module, in which a boundary of the top polarizer is extended from a boundary of the liquid crystal display module.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION

Figure 1:
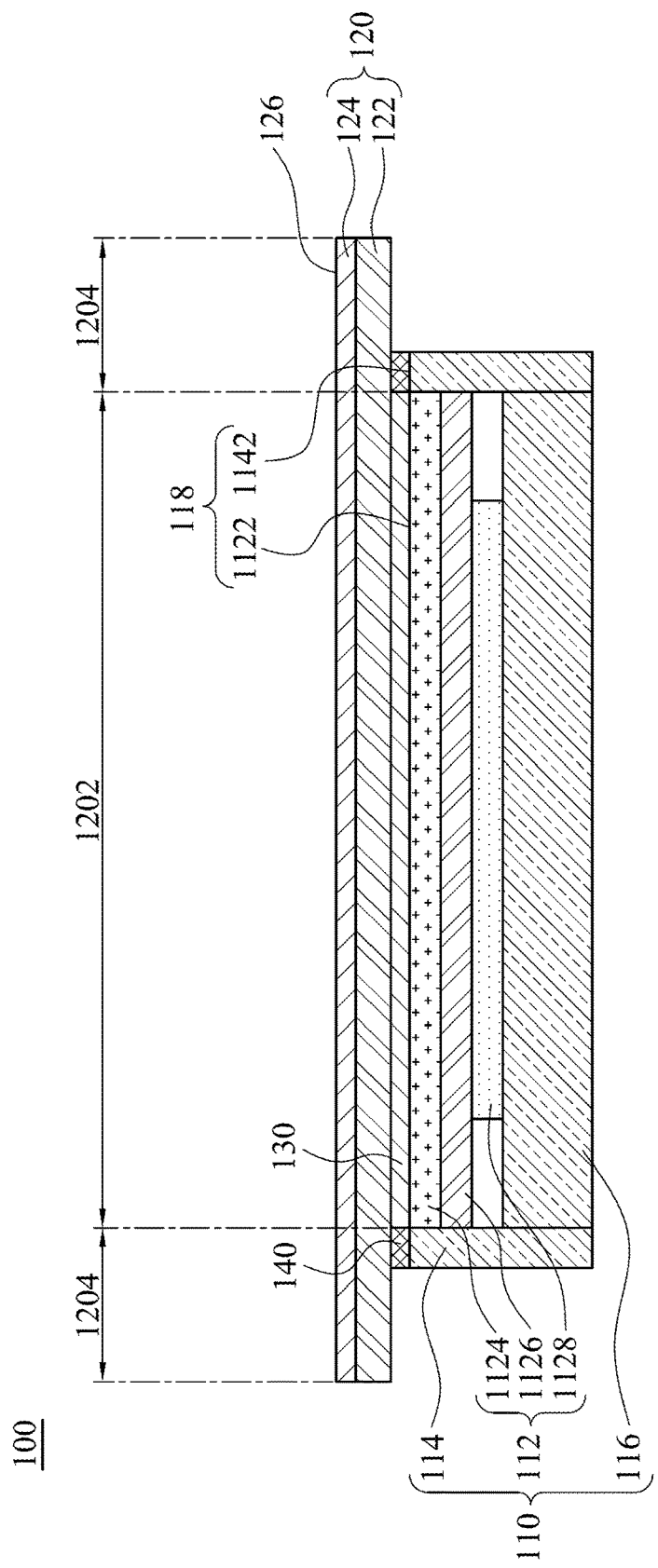
FIG. 1 is a longitudinal sectional view of a liquid crystal display apparatus according to an embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

It will be understood that when an element is referred to as being "on" another element, it can be directly on the other element or intervening elements may be present therebetween. In contrast, when an element is referred to as being "directly on" another element, there are no intervening elements present.

Figure 2:
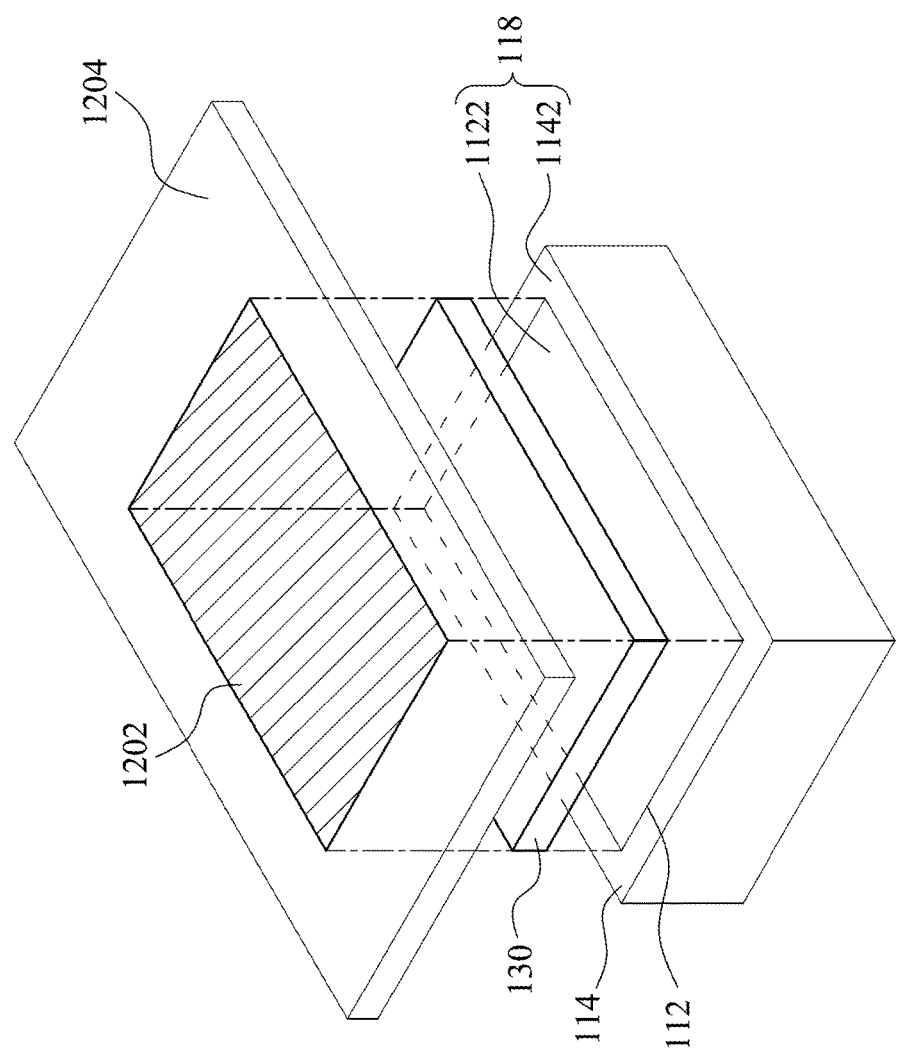
FIG. 2 is an explosive view of the liquid crystal display apparatus in FIG. 1.

FIG. 1 illustrates a longitudinal sectional view of a liquid crystal display apparatus 100 according to an embodiment of the present disclosure. FIG. 2 illustrates an explosive view of the liquid crystal display apparatus 100 in FIG. 1. As shown in FIG. 1, the liquid crystal display apparatus 100 includes a liquid crystal display module 110 and a top polarizer 120. The liquid crystal display module 110 has an upper surface of the liquid crystal display module 118. In present embodiment, the top polarizer 120 is disposed on the upper surface of display module 118. The top polarizer 120 has a reinforced surface 126, located at a surface of the top polarizer 120, which is facing away from the liquid crystal display module 110, in which a boundary of the top polarizer 120 is extended from a boundary of the liquid crystal display module 110.

It should be noted that, "extended", as described herein, may include few situations, for example, the boundary of the top polarizer extends out from boundary of the liquid crystal display module; the boundary of the top polarizer aligns with boundary of the liquid crystal display module or at least a portion of the boundary of the top polarizer extends out from boundary of the liquid crystal display module and remained portion of the boundary of the top polarizer aligns with boundary of the liquid crystal display module; moreover, sometimes a portion of the boundary of the top polarizer may be located inner than the boundary of the liquid crystal display module, so that the liquid crystal display apparatus can achieve the requirement of predetermined appearance, which will be described in detailed below. It should be understood that, aspect of the top polarizer 120, described above, is only an example, and not intended to limit the present disclosure, could be adjusted to actual demand by those skilled in the art. That is to say, prerequisite of the top polarizer is to cover and protect an upper surface of a liquid crystal display portion 1122, the upper surface of the liquid crystal display portion 1122 shall be described in detail below.

As a consequence of the top polarizer 120 has the reinforced surface 126, the top polarizer 120 obtains a protective ability to function as a protection layer, so that the top polarizer 120 could substitute a cover lens as a protection layer in present disclosure. Therefore, the fabricating process of the liquid crystal display apparatus 100 could omit specific processes related to the cover lens. The fabricating process of the present disclosure would be described in detail below. Owing to the coverlens-less structure of the liquid crystal display apparatus 100 in the present disclosure, as a result, the shortcoming of the prior art, such as complex fabricating process in proceeding full lamination with transparent OCA or hydrogel in-between a cover lens and a liquid crystal display module, or creating a gap between a cover lens and a liquid crystal display module by attaching the cover lens onto the upper fringe of a frame surrounding the liquid crystal display module, could be overcame or avoided with adopting the liquid crystal display apparatus 100 in present disclosure.

Besides, the novel structure of the liquid crystal display apparatus 100, substituting the top polarizer 120 for a cover lens, is able to reduce thickness, weight and cost of material for the liquid crystal display apparatus in the same time. Moreover, comparing material of the top polarizer 120 with material of a cover lens, the top polarizer 120 is much easier to reshape to achieve various requirements of predetermined appearance or shape. Specifically, as long as the top polarizer 120 covers and protects an upper surface of a liquid crystal display portion 1122, keeping the liquid crystal display portion display normally, the top polarizer 120 could be any shape as demand.

In the present embodiment, the top polarizer 120 includes a main body of the polarizer 122 and a reinforced film 124. The reinforced film 124 is formed at a surface of the main body of the polarizer 122 facing away from the liquid crystal display module 110. In the present embodiment, the reinforced film 124 may include a hard coating layer and/or an anti-glare coating layer, in which the hard coating layer would make the surface hardness of the reinforced surface 126 become larger than or equal to the pencil hardness of 3H. Thus, the top polarizer 120 with the reinforced surface 126 is capable to protect the other portions of the liquid crystal display apparatus 100. In the present embodiment, the reinforced film 124 may further include an anti-reflection coating and/or a coating to provide wide viewing angle. In the present embodiment, thickness of the top polarizer 120 is less than or equal to 500 μm. In the present embodiment, thickness of the top polarizer 120 is larger than 100 μm.

As shown in FIG. 2, in the present embodiment, the liquid crystal display module 110 includes the liquid crystal display portion 112 and a frame 114. The liquid crystal display portion 112 has the upper surface of the liquid crystal display portion 1122. The frame 114 has an upper surface of the frame 1142. The frame 114 is surrounded to define a capacity space. The liquid crystal display portion 112 is located inside the capacity space, in which the upper surface of the liquid crystal display portion 1122 and the upper surface of the frame 114 are together to form or define the upper surface of display module 118. Material of the frame 114 may include metal, plastic and/or other suitable material. Forging molding, casting molding, cutting molding, or injection molding may produce the frame 114.

In the present embodiment, the top polarizer 120 further has a covered area 1202 (hatch area shown in FIG. 2), and a boundary of the covered area 1202 is aligned with a boundary of the upper surface of the liquid crystal display portion 1122. Thus, the length and the width of the covered area 1202 is respectively equal to a corresponding length and width of the upper surface of the liquid crystal display portion 1122, and the vertical projection of the covered area 1202 and the upper surface of the liquid crystal display portion 1122 overlapped with each other, that is to say, the area of the top polarizer 120 which is overlapped with the normal projection of the upper surface of the liquid crystal display portion 1122 is so called the covered area 1202.

It should be noted that, "the length and the width", as described herein, is the parameters of a long-side and a wide-side in object, in which the long-side is defined as a relatively long side of the liquid crystal display apparatus in the horizontal direction, and a relative short side of the liquid crystal display apparatus in the horizontal direction is defined as the wide-side, the length and the width are respectively corresponding to the parameters of the long-side and the wide-side. It should be understood that, aspect of the length and the width, described above, is only an example, and not intended to limit the present disclosure. Yet, if the shape of the liquid crystal display apparatus is not a rectangle, the length and the width could be flexibly opted to actual demand of other size parameters by those skilled in the art.

In the present embodiment, the top polarizer 120 further has a peripheral area 1204, the area of the peripheral area 1204 includes an area which is extended outward from the boundary of the covered area 1202 to the boundary of the top polarizer 120. That is, except for the area of the top polarizer 120 overlapped with the normal projection of the upper surface of the liquid crystal display portion 1122, the remained area of the top polarizer 120 is so called the peripheral area 1204. As shown in FIG. 1 and FIG. 2, in the present embodiment, part of the vertical projection of the peripheral area 1204 on the upper surface of the frame 1142 is overlapped with the upper surface of the frame 1142.

Figure 3:
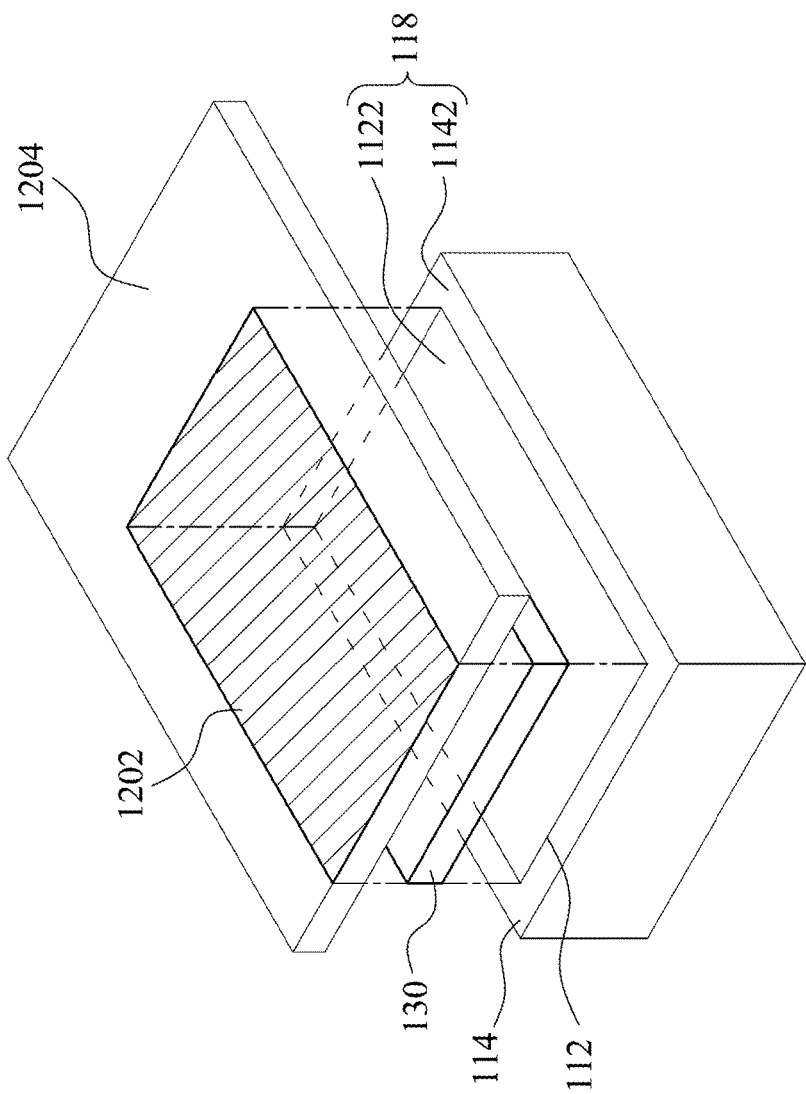
FIG. 3 is an explosive view of the liquid crystal display apparatus according to another embodiment of the present disclosure.

It should be understood that, the shape of the peripheral area 1204, illustrated above, is only an example, and not intended to limit the present disclosure, if the top polarizer of the liquid crystal display apparatus needs to fulfill the requirement of the outer appearance, could be flexibly opted the shape and size of the peripheral area 1204 to actual demand by those skilled in the art. For example, as shown in FIG. 3, in another embodiment, the vertical projection of the peripheral area 1204 on the upper surface of the frame 1142 overlaps at least a part of the upper surface of the frame 1142.

Owing to the covered area 1202 of the top polarizer 120 already has adequate size to protect the vulnerable upper surface of a liquid crystal display portion 1122 which underneath the covered area of the top polarizer 120, so that the liquid crystal display apparatus 200 could display normally. As a consequence, the remained area of the top polarizer 120, that is the peripheral area 1204, may be processed to a demanding appearance under various requirements. Moreover, due to the material of the top polarizer 120, so that the top polarizer 120 is much easier to be processed to demanding appearance than the cover lens used to be.

Referring to FIG. 1, in the present embodiment, the liquid crystal display apparatus 100 further includes a pressure sensitive adhesive layer 130. The pressure sensitive adhesive layer 130 is disposed between the covered area 1202 and the upper surface of the liquid crystal display portion 1122, and respectively attached to the covered area 1202 and the upper surface of the liquid crystal display portion 1122. That is, the covered area 1202 and the upper surface of the liquid crystal display portion 1122 are bonded together through attaching the pressure sensitive adhesive layer 130, and the light emitted from the liquid crystal display module 110 could transmit through the pressure sensitive adhesive layer 130, then emits out the top polarizer 120. In the present embodiment, the material of the pressure sensitive adhesive layer 130 is a pressure sensitive adhesive or other suitable material. Adopting the pressure sensitive adhesive herein, not intended to limit the present disclosure, as a matter of fact, the pressure sensitive adhesive layer 130 could be other aspect of transparent adhesive material, which could bond the covered area 1202 and the upper surface of the liquid crystal display portion 1122 together, and the light emitting from the liquid crystal display module 110 could transmit through the pressure sensitive adhesive layer 130 to the top polarizer 120, would be a proper option for the pressure sensitive adhesive layer 130.

In the present embodiment, the liquid crystal display apparatus 100 further includes an adhesion agent 140, the adhesion agent 140 is disposed between the peripheral area 1204 and the upper surface of the frame 1142, and respectively attached to the peripheral area 1204 and the upper surface of the frame 1142 in an opening space. In the present embodiment, the adhesion agent 140 could be a gasket. In the other embodiments, the adhesion agent 140 could be a foam tape, polycarbonate, poly(methyl methacrylate) or a combination thereof. The adhesion agent adopted herein, not intended to limit the present disclosure, as a matter of fact, the adhesion agent 140 could be another aspect of adhesive material, which could bond the top polarizer 120 and the frame 114 together, would be a proper option for the adhesion agent 140.

In the present embodiment, the liquid crystal display portion 112 includes a liquid crystal display panel and a bottom polarizer 1128, in which the liquid crystal display panel is located between the top polarizer 120 and the bottom polarizer 1128. In the present embodiment, the liquid crystal display panel includes a thin film transistor substrate 1126 and a color filter substrate 1124. The color filter substrate 1124 is bonded with the thin film transistor substrate 1126, and the color filter substrate 1124 is located between the thin film transistor substrate 1126 and the top polarizer 120, in which the thin film transistor substrate 1126 is disposed between the color filter substrate 1124 and the bottom polarizer 1128. In the present embodiment, the liquid crystal display apparatus 100 further includes a backlight module 116 disposed at a surface of the bottom polarizer 1128 away from the top polarizer 120.

Figure 4:
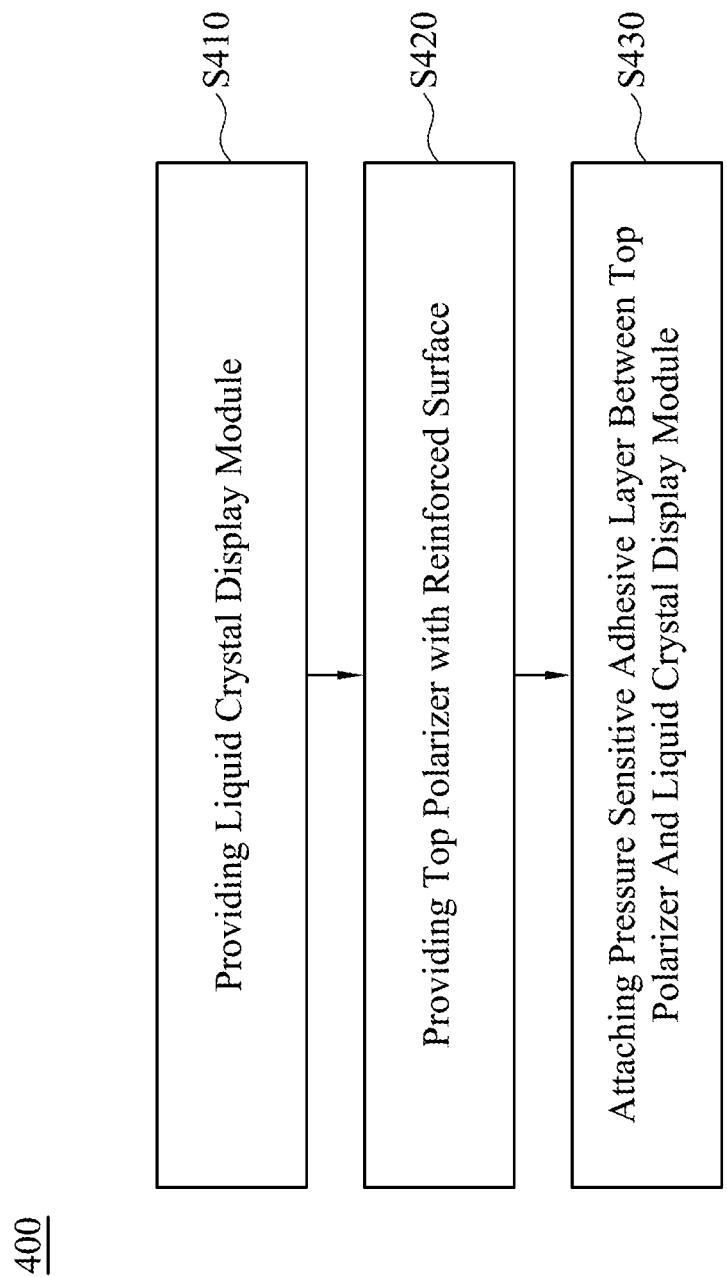
FIG. 4 is a flow chart of a method for fabricating the liquid crystal display apparatus.

FIG. 4 illustrates a flow chart of a method 400 for fabricating the liquid crystal display apparatus according to an embodiment of the present disclosure. As shown in FIG. 4, the method 400 for fabricating the liquid crystal display apparatus is provided, which includes step S410 to step S430. In step S410, a liquid crystal display module is provided. In step S420, providing a top polarizer. The top polarizer, which is provided in step S420, has a reinforced surface located at the surface of the top polarizer facing away from the liquid crystal display module. In step S430, the pressure sensitive adhesive layer is attached between the top polarizer and the liquid crystal display module, so that the boundary of the top polarizer is extended from the boundary of the liquid crystal display module.

Owing to the method 400 could fabricate a liquid crystal display apparatus without cover lens, the fabricating process related to the cover lens, such as attaching a cover lens onto the liquid crystal display module, is able to be omitted. So that, considering the shortcoming of the prior art, for example, complex fabricating process in proceeding full lamination with transparent OCA or hydrogel in-between the cover lens and the liquid crystal display module, or creating a gap between the cover lens and the liquid crystal display module from attaching the cover lens onto upper fringe of a frame surrounding the liquid crystal display module, would be overcame or avoided as adopting the method 400 for fabricating the liquid crystal display apparatus with a reinforced top polarizer in present disclosure. Furthermore, the method 400 for fabricating the liquid crystal display apparatus is simplified by adopting the top polarizer to replace the cover lens in the liquid crystal display apparatus, it's may reduce time for proceeding fabrication, which lead to increase the production rate, and in the meanwhile, exclusion of the cover lens in the liquid crystal display apparatus also reduces the thickness, weight and cost of the liquid crystal display apparatus.

In the present embodiment, step S420 includes providing a main body of the top polarizer and forming a reinforced film. Forming the reinforced film is to form the reinforced film onto the surface of the main body of the top polarizer facing away from the liquid crystal display module, in which the reinforced surface is located at the surface of the reinforced film facing away from the liquid crystal display module, and the surface hardness of the reinforced surface is larger than or equal to the pencil hardness of 3H. The top polarizer described herein may refer to the top polarizer 120 illustrated in FIG. 1.

In the present embodiment, the liquid crystal display module, provided in the step S410, includes a frame and a liquid crystal display portion. The frame and the liquid crystal display portion respectively have an upper surface of the frame and an upper surface of the liquid crystal display portion. The top polarizer further has a covered area and a peripheral area. The boundary of the covered area is aligned with the boundary of the liquid crystal display portion, and the peripheral area is extended outward from the boundary of the covered area, the peripheral area is overlapped with at least part of the upper surface of the frame and covered it. Referring to FIGS. 1, 2 and 3, the figures respectively illustrates the liquid crystal display apparatus 100, and the liquid crystal display apparatus 300, which could be referred to the liquid crystal display module and the top polarizer described herein.

In the present embodiment, attaching the pressure sensitive adhesive layer between the top polarizer and the liquid crystal display module in step S430, moreover, the pressure sensitive adhesive layer is attached between the covered area of the top polarizer and the liquid crystal display module. The pressure sensitive adhesive layer described herein could be referred to the pressure sensitive adhesive layer 130 illustrated respectively in FIG. 1, 2.

In the present embodiment, the method 400 for fabricating the liquid crystal display apparatus further includes using an adhesion agent to attach the peripheral area and a portion of the upper surface of the frame overlapped with the peripheral area. The adhesion agent described herein may be referred to the adhesion agent 140 illustrated in FIG. 1.

Although some embodiments of the present disclosure and their advantages have been described in detail, it should be understood that various changes, substitutions, and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, fabricate, composition of matter, means, methods, and steps described in the specification. As one of ordinary skill in the art will readily appreciate from the disclosure of the present disclosure, processes, machines, fabricate, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, fabricate, compositions of matter, means, methods, or steps.

What is claimed is:

1. A liquid crystal display apparatus, comprising:
a liquid crystal display module comprising a frame and a liquid crystal display portion located inside the frame, wherein an upper surface of the liquid crystal display portion and an upper surface of the frame collectively from an upper surface of the liquid crystal display module,
a top polarizer being as an outermost layer of the liquid crystal display apparatus as a protective layer of the liquid crystal apparatus, the top polarizer comprising:
an optical polarizer main body disposed on the upper surface of the liquid crystal display module; and
a reinforced coating layer monolithically formed on a surface of the optical polarizer main body facing away from the liquid crystal display module, wherein the optical polarizer main body is in direct contact with the reinforced coating layer, and a surface of the reinforced coating layer facing away from the liquid crystal display module is a reinforced surface,
wherein when viewed from a normal direction that is normal to an upper surface of the top polarizer, the liquid crystal display apparatus has a center line that extends in the normal direction, the frame is extended past an outermost boundary of the liquid crystal display module in the direction away from the center line of the liquid crystal display apparatus, and the top polarizer is extended past an outermost boundary of the frame in the direction away from the center line of the liquid crystal display apparatus.

2. The liquid crystal display apparatus of claim 1, wherein the reinforced coating layer comprises a hard coating layer, an anti-glare coating layer, or the combination thereof.

3. The liquid crystal display apparatus of claim 1, wherein a surface hardness of the reinforced surface is larger than or equal to the pencil hardness of 3H.

4. The liquid crystal display apparatus of claim 1, wherein a thickness of the top polarizer is less than or equal to 500 μm.

5. The liquid crystal display apparatus of claim 4, wherein the thickness of the top polarizer is larger than 100 μm.

6. The liquid crystal display apparatus of claim 1, wherein the top polarizer further comprises a covered area, and a boundary of the covered area is aligned with a boundary of the upper surface of the liquid crystal display portion.

7. The liquid crystal display apparatus of claim 6, further comprising a pressure sensitive adhesive layer, the pressure sensitive adhesive layer being disposed between the covered area and the upper surface of the liquid crystal display portion and attached to the covered area and the surface of the liquid crystal display portion, respectively.

8. The liquid crystal display apparatus of claim 6, wherein the top polarizer further has a peripheral area, and the peripheral area is extended outward from the boundary of the covered area.

9. The liquid crystal display apparatus of claim 8, wherein a vertical projection of the top polarizer overlaps a part of the frame that is extended past the outermost boundary of the liquid crystal display module in the direction away from the center line of the liquid crystal display apparatus, and a vertical projection of the peripheral area at the upper surface of the frame is overlapped with at least a part of the upper surface of the frame.

10. The liquid crystal display apparatus of claim 9, further comprising an adhesion agent, the adhesion agent being disposed between the peripheral area and the upper surface of the frame and attached to the peripheral area and the upper surface of the frame respectively.

11. The liquid crystal display apparatus of claim 1, wherein the top polarizer is extended past the outermost boundary of the liquid crystal display module in a direction away from the center line of the liquid crystal display apparatus.

12. The liquid crystal display apparatus of claim 11, wherein the top polarizer is extended from the outermost boundary of the liquid crystal display module in the direction away from the center line of the liquid crystal display apparatus in all directions perpendicular to the normal direction.

13. The liquid crystal display apparatus of claim 11, wherein the top polarizer is extended from the outermost boundary of the frame in the direction away from the center line of the liquid crystal display apparatus in all directions perpendicular to the normal direction.

14. A method for fabricating a liquid crystal display apparatus, comprising:
providing a liquid crystal display module comprising a frame and a liquid crystal display portion located inside the frame, wherein an upper surface of the liquid crystal display portion and an upper surface of the frame collectively from an upper surface of the liquid crystal display module;

providing an optical polarizer main body of a top polarizer;

directly coating a reinforced coating layer on a surface of the optical polarizer main body of the top polarizer, wherein the optical polarizer main body of the top polarizer is in direct contact with the reinforced coating layer, and a surface of the reinforced coating layer is a reinforced surface; and attaching a pressure sensitive adhesive layer between the top polarizer and the liquid crystal display module so that the top polarizer covers on the upper surface of the liquid crystal display module, wherein, when viewed from a normal direction that is normal to an upper surface of the top polarizer, the liquid crystal display apparatus has a center line that extends in the normal direction, the frame is extended past an outermost boundary of the liquid crystal display module in the direction away from the center line of the liquid crystal display apparatus, and the top polarizer is extended past an outermost boundary of the frame in direction away from the center line of the liquid crystal display apparatus.

15. The method of claim 14, wherein a surface hardness of the reinforced surface is larger than or equal to the pencil hardness of 3H.

16. The method of claim 14, wherein the top polarizer further has a covered area and a peripheral area, a boundary of the covered area is aligned with a boundary of the liquid crystal display portion, the peripheral area is extended outward from the boundary of the liquid crystal display portion, and the peripheral area is overlapped with at least a part of the surface of the frame.

17. The method of claim 16, wherein the attaching comprises attaching the pressure sensitive adhesive layer between the covered area and the upper surface of the liquid crystal display portion.

18. The method of claim 17, further comprising using an adhesion agent to attach the peripheral area and at least a part of the upper surface of the frame overlapped with the peripheral area.

* * * * *